United States Patent [19]

Garabedian et al.

[11] Patent Number: 4,786,462
[45] Date of Patent: Nov. 22, 1988

[54] SUPPORT STRUCTURE FOR A NUCLEAR REACTOR

[75] Inventors: George Garabedian, Boston; Robert A. DeLuca, Newton Center; George A. Gurnis, Cohasset; William C. Craig, Cambridge; James M. Barker, Reading, all of Mass.

[73] Assignee: Stone & Webster Engineering Corp., Boston, Mass.

[21] Appl. No.: 582,016

[22] Filed: Feb. 21, 1984

[51] Int. Cl.⁴ .............................................. G21C 13/00
[52] U.S. Cl. ................................... 376/293; 376/272; 376/285; 376/402; 376/461
[58] Field of Search ............... 376/272, 273, 285, 293, 376/295, 296, 394, 402, 461; 52/224

[56] References Cited

U.S. PATENT DOCUMENTS

| | | |
|---|---|---|
| 3,182,002 | 5/1965 | Laithwaite et al. . |
| 3,242,981 | 3/1966 | Hutchinson et al. ............... 376/293 |
| 3,344,032 | 9/1967 | Vendryes et al. ................... 376/272 |
| 3,410,752 | 11/1968 | Dell . |
| 3,425,907 | 2/1969 | Bonsel et al. . |
| 3,461,034 | 8/1969 | Fortescue ........................... 376/296 |
| 3,793,143 | 2/1974 | Müller . |
| 3,984,282 | 10/1976 | Kleimola ............................ 376/293 |
| 4,045,285 | 8/1977 | Baumgaertner et al. ........... 376/394 |
| 4,064,005 | 12/1977 | Baujat ................................ 376/293 |
| 4,120,348 | 10/1978 | Pouderoux . |
| 4,295,934 | 10/1981 | Robin . |
| 4,311,558 | 1/1982 | Schwiers et al. ................... 376/296 |
| 4,335,467 | 6/1982 | Robin . |

FOREIGN PATENT DOCUMENTS

| | | | |
|---|---|---|---|
| 2729984 | 1/1979 | Fed. Rep. of Germany | 376/296 |
| 2812124 | 9/1979 | Fed. Rep. of Germany | 376/402 |
| 3026396 | 2/1981 | Fed. Rep. of Germany | 376/296 |
| 1235280 | 6/1971 | United Kingdom | 376/296 |
| 2015806 | 9/1979 | United Kingdom | 376/293 |

OTHER PUBLICATIONS

Argonne National Laboratory, A Study of Basic Approaches to the Design of the Primary System of Loop-Type LMFBRS (1978), pp. V.G.T.-V.H.-2; VIII.B-5-23.

Vint, Engineering Design for Earthquake Environments, J. Mech. E. Conference Pub. 1978-12, pp. 119-127.

Primary Examiner—Charles T. Jordan
Assistant Examiner—Richard W. Wendtland
Attorney, Agent, or Firm—Hedman, Gibson, Costigan & Hoare

[57] ABSTRACT

A novel concrete core support structure for nuclear reactors is described.

17 Claims, 10 Drawing Sheets

SUPPORT STRUCTURE FOR A NUCLEAR REACTOR

FIELD OF THE INVENTION

This invention is concerned with support structures for nuclear reactors.

BACKGROUND OF THE INVENTION

Nuclear reactors are well known and have been utilized for steam generation by circulation of a liquid coolant from the area of the reactor core to a heat exchanger means. The nuclear reactors have been supported by various types of steel and concrete structures. The prior art support structures have been fabricated from concrete and/or steel columns and cross braces which have been designed with various walls separating the reactor components.

These prior art support structures have been difficult to fabricate and have been modified to include seismic reinforcing elements. The seismic reinforcing elements include additional reinforcing rods within the concrete structures, auxilliary snubbers, hangers and bumpers. These elements are expensive to fabricate and install, difficult to inspect and limited in their ability to protect the reactor structures from damage due to the stresses induced by high ground level acceleration.

Prior reactor support structures result in a structural configuration that significantly amplifies seismic forces to important safety related components such as the reactor vessel.

This is due to the fact that the mass to stiffness characteristics of the support structure results in a fundamental support structure frequency which is within the range of the supported component. This results in ground seismic forces being amplified by the structure to impose large seismic loads to the supported items. There are two ways to deal with the problem of accomodating seismic forces. One way is to make the structures, systems, and components sufficiently strong so they can accomodate these loads. The alternate approach is to change the configuration so that the components do not absorb all of the loads.

In the prior art both approaches have been used. Changes in configuration have included providing flexibility in the item of interest; changing the natural frequency of the component such that its frequency of vibration does not coincide with the amplified response of the supporting structure; embedment below grade of the reactor support structure; or providing an energy absorption device.

Energy absorption devices include design approaches using snubbers, ductile joints, or seismic isolation pads.

The design of liquid metal reactor vessels and piping is more sensitive to seismic disturbances than conventional reactor concepts because of thin walled vessels and piping associated with high temperature liquid metal systems. Prior art designs have had difficulty in providing support concepts which would adequately limit seismic forces to major vessels such as the reactor vessel. Current U.S. designs for commercially (1000 Mwe or greater) sized loop LMFBR plants result in high horizontal seismic shear forces being amplified by the reactor vessel structural support system for sites which have rock type (soil shear wave velocity greater than 3500 ft/sec) sites.

Studies for the loop plant have shown that for a given plant configuration the major components needing seismic protection are subjected to less severe seismic design requirements for sites with less firm soil characteristics (soil shear wave velocities less than 2000 ft/sec) due to the beneficial effects of soil-structure interaction For harder sites with rock type of foundation (soil sheer wave velocity greater than 3500 ft/sec) alternative design methods for limiting seismic forces have been investigated. For the U.S. consideration has been given to limiting the plant location to sites with suitable soil and seismic conditions; for the French Superphenix II LMRBR pool plant, consideration is being given to use of seismic isolators for limiting seismic forces to the reactor vessel; and for the United Kingdom's commercial design pool plant (CDFR) the designers approach is to embed the nuclear reactor vessel support structure below grade up to the reactor vessel support ledge in order to reduce forces to the reactor vessel (embedment does not have a large effect on modifying vertical response).

Use of embodment or seismic isolators results in a plant design which is costly and more difficult to construct. Limitations of sites to those with the proper seismicity levels and soil conditions is also undesirable since this approach could result in significantly reducing the available number of sites.

SUMMARY OF THE INVENTION

The invention comprises a monolithic reinforced concrete support structure for a nuclear reactor. The support structure comprises a reinforced concrete base, a unitary reinforced concrete core, said reinforced concrete core containing voids for installation and support of a reactor vessel. Additional voids may be provided to accomodate other major components which need to be seismically protected.

An alternate approach for changing the configuration to accomodate seismic forces is provided by applying the principles of structural and soil dynamics (reference 1) utilized for machine foundation design. By having a support structure sufficiently rigid, its resonant frequencies will be far enough above the resonant frequency of the machine that a large fraction of the vibratory motions are not transmitted from the supported machine. Principles for calculation of the natural frequency of structures is provided in reference (2). This invention applies this structural dynamics principle by providing a support design that has a natural frequency much higher than the supported component, and in this manner effectively limiting amplification of a large fraction of the vibratory forces of a seismic disturbance to the supported component. The preferred embodiment of this invention describes a monolithic reinforced concrete structure with a natural horizontal frequency greater than 10 Hertz. The major vessels supported by this structure have a natural horizontal frequency in the range of 4 to 6 Hz.

In this manner, the internal structures, systems and components which are supported or are a part of the structure can be isolated from amplification of ground level seismic forces. Only loads near the natural frequency of the monolith are amplified, but since the frequency of the supported component is significantly less than the support, the transmission of the amplified seismic loads to the component will be reduced. The extent to which this tranmission is reduced is a function of the natural frequencies and can be determined from analysis (reference 1 or 2). This analysis may be carried using known techniques as described in (1) *Vibrations of Soils and Foundations* by F. E. Richart, Jr., J. R. Hall Jr., and RD Woods, Prentice-Hall, 1970 and (2) *Dynamics of Structures*, by Clough, R. W. Penzien, J. McGraw-H.71, 1975, both of which are incorporated by reference.

The undamped natural frequency may generally be expressed by the formula $$fn = \frac{1}{2\pi}\sqrt{\frac{k}{m}}$$

wherein fn is cycles/second or Hertz; k is the stiffness in units of force required to displace the structure a given distance and m equals the weight of the structure displaced by k.

The monolithic reinforced concrete structure of the invention provides a means of supporting a nuclear power plant reactor as well as other major vessels which need seismic protection. The unitary design inherently limits seismic forces to the supported vessels and it is also easier to construct the monolithic support structure than the prior art support structures.

Accordingly, it is a primary object of this invention to provide a novel support structure for a nuclear reactor.

It is also a further object to provide a novel nuclear reactor support structure that has inherent seismic resistance and can provide a seismically stable support for other major vessels which need protection from seismic disturbances.

It is also a further object of this invention to provide a novel nuclear reactor support structure that is relatively easy and quick to fabricate.

It is also a further object of this invention to provide a novel nuclear reactor support structure that may be situated on or below grade level.

It is also a further object of this invention to provide a novel nuclear reactor structure that simplifies the shielding of the nuclear reactor.

These objects are attained by a support structure comprising:

A support structure for a nuclear reactor: (a) a unitary reinforced concrete core containing a void for support of a nuclear reactor vessel, said concrete core providing shielding for radiation from the reactor vessel; (b) said reinforced concrete core having means for transferring heat from the reactor vessel; (c) said reinforced concrete core having a distribution of mass and stiffness which provides a fundamental horizontal natural frequency of vibration greater than 10 Hertz and greater than the natural frequency of the supported components.

For reactor concepts which have need of seismic protection of other large vessels the unitary core can be increased in size to provide additional voids for these vessels.

BRIEF DESCRIPTION OF THE DRAWINGS

The objects and advantages of the invention will become more apparent from a review of the appended drawings and specification.

DETAILED DESCRIPTION OF THE INVENTION

The monolith nuclear reactor support structure may be used with any type of nuclear reactor including light water reactor vessels and liquid metal reactor concept vessels. Liquid metal reactors of the pool or loop type may be supported by the monolith support structure of the invention. The preferred type of liquid metal reactor for use in the monolithic support structure of the invention is described in an application filed as of even date herewith by George Garabedian. The monolith support structure is made of reinforced concrete and comprises a base member and a unitary core member. The base member is intended to serve as a foundation to support the unitary core and other structures which need to be designed for seismic disturbances. The foundation may be placed at, above, or below grade depending on soil conditions and other considerations such as hydrology. For the preferred embodiment, the top of the basemat is at grade and the top of the monolith unitary case above grade is 64 feet. The unitary core is integrally formed with the base member using standard practices in the reinforced concrete arts. Generally light rebar density requiring simple lap splicing may be used for the unitary core. Other reinforcing techniques including pre-stressing and post-stressing using conventional materials can be employed.

The unitary core member has a central vertical void for the reactor vessel and satellite vertical voids for housing satellite tanks that are radially arranged around the central vertical void. The unitary core also provides horizontal voids to permit cross-connection between the reactor vessel and the satellite tanks. It is also contemplated that inspection access passageways will be present in the unitary core structure as well as conduit passageway for ventilation and control and monitoring cables and devices.

The various voids are made large enough to accomodate the reactor components as well as an exterior containment structure including appropriate layers of insulation. The ratio of the entire gross area of the surface of the monolith to the void area is greater than 2.0. In addition, the ligaments between voids or between a void and the edge of the monolith are sufficiently large to assure that deformation of the monolith is shear controlled.

Figure 3:
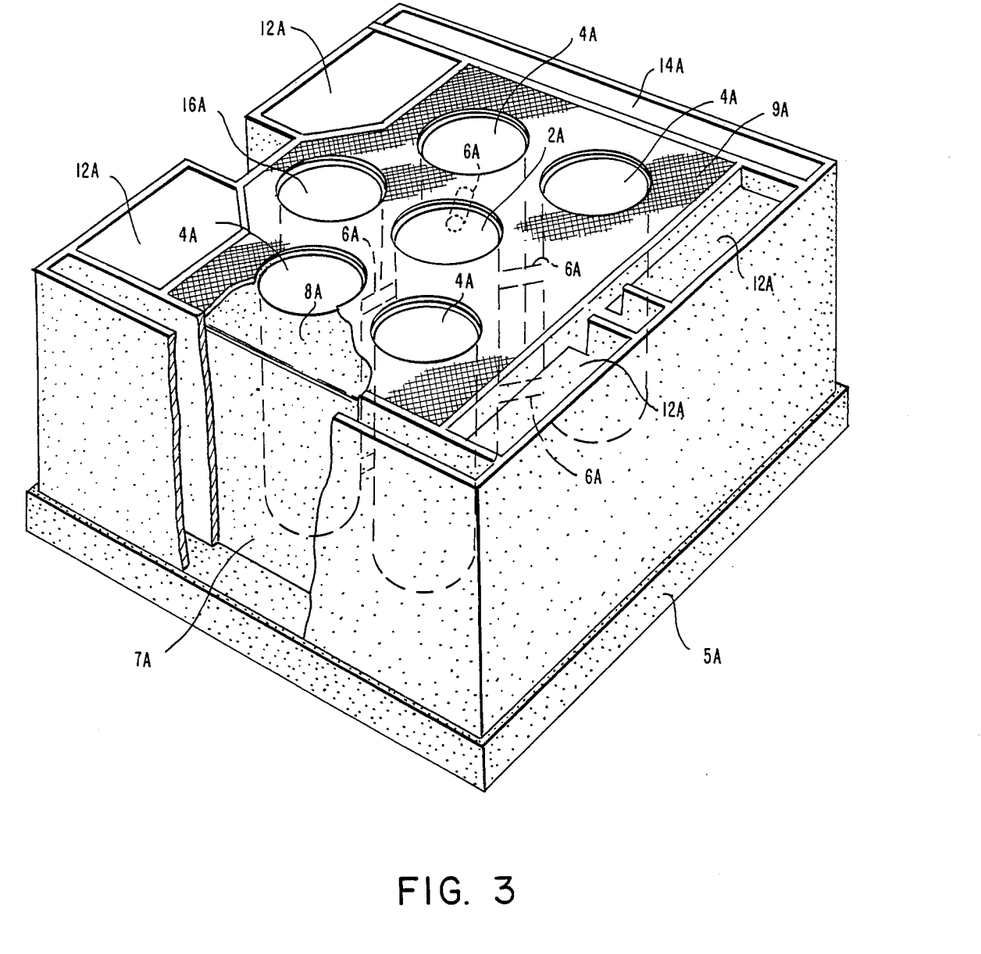
FIG. 3 is a diagrammatic sectional elevational view of the liquid metal reactor that may be situated in a single monolithic support structure of the invention with a single satellite tank.

The present invention is best seen in FIG. 3 in an embodiment which shows central vertical void 2A for a liquid metal reactor vessel. The satellite vessel voids 4A are for satellite tanks that are connected to the reactor vessel by conduits that are placed in horizontal voids 6A. The reinforced concrete base 5A is a common basemate for supporting the unitary reinforced concrete core 7A as well. A steel deck platform 9A is provided above the top of the unitary concrete core 8A and serves as an operating platform as well as a cover for cabling and cable trays which are routed above the top surface of unitary core. A vertical access tunnel (not shown) is provided between the satellite vessels in order to service and maintain the expansion joints on the containment conduits connecting each satellite containment vessel with the reactor vessel containment vessel.

Compartments 12A for steam generation means are formed adjacent to unitary reinforced concrete core 7A. Accessory compartments 14A are also formed adjacent to the unitary concrete core 7A to contain accessory piping and monitoring equipment. Vertical fuel storage void 16A will contain a fuel storage vessel in a suitable protective environment in close proximity to the central vertical void.

Figure 4:
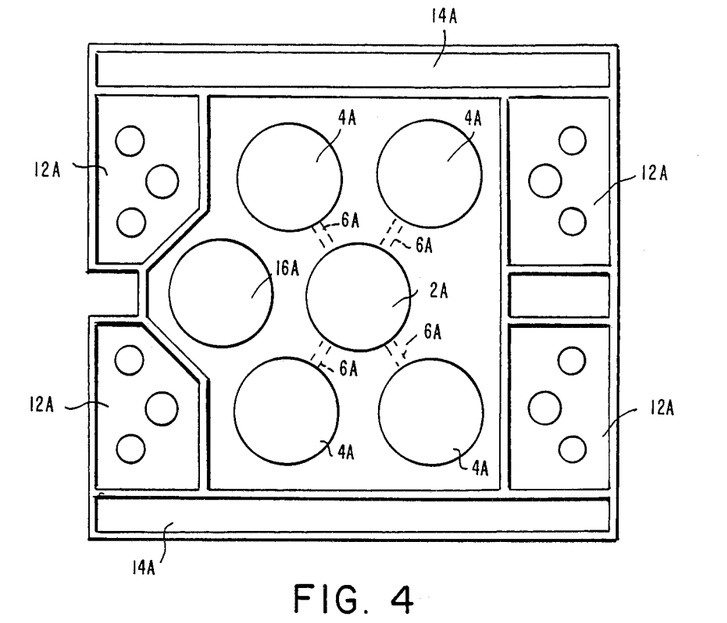
FIG. 4 is a top plan view of a monolithic support structure of the invention.
Figure 5:
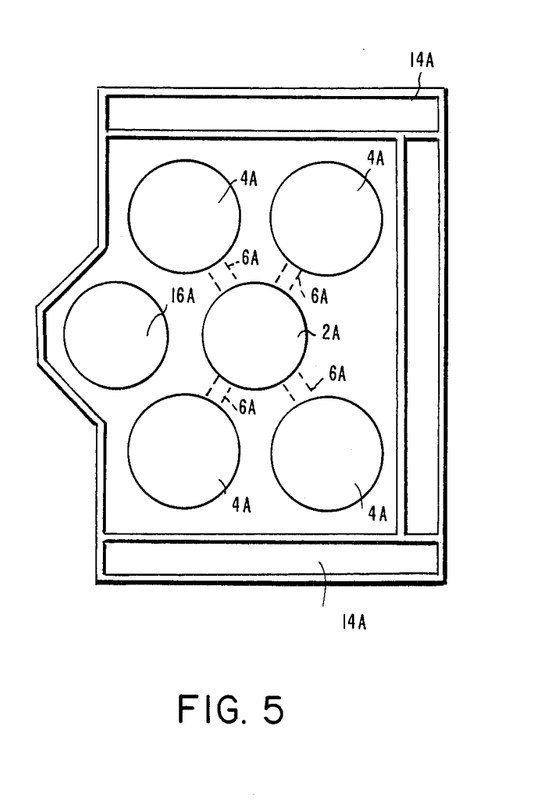
FIG. 5 is a top plan view of a monolithic support structure of the invention.
Figure 6:
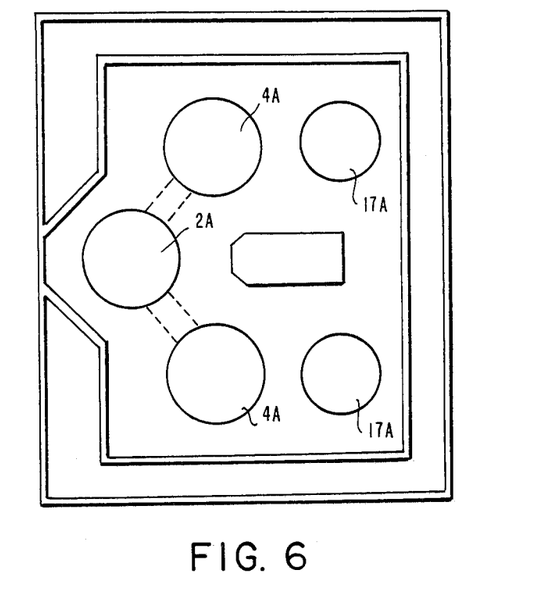
FIG. 6 is a top plan view of a monolithis support structure of the invention.
Figure 7:
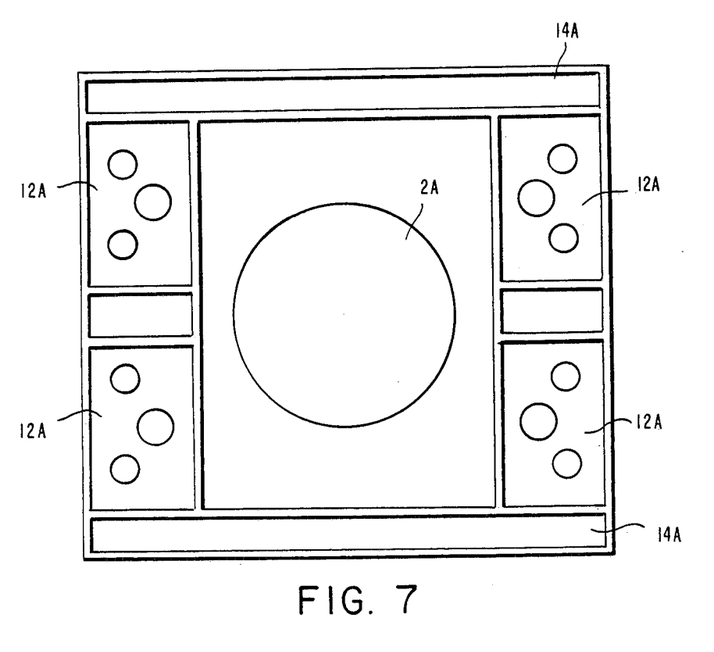
FIG. 7 and FIG. 8 are top plan views of a monolithic support structure of the invention.
Figure 8:
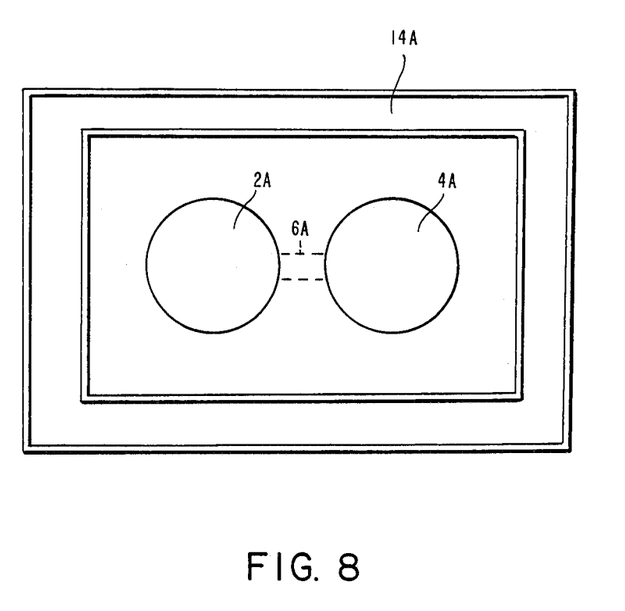

FIGS. 5 through 8 illustrate alternate embodiments of this invention. FIG. 5 provides an embodiment whereby the satellite tanks contain steam generation means and separate compartments 12A of FIG. 4 are not required. FIG. 6 illustrates an embodiment wherein two satellite tanks 4A and a reactor vessel void 2A are provided. Steam generator voids 17A are also provided in the monolith as well as void 18A for auxiliary components. FIG. 7 provides an embodiment that features a single void 2A for the reactor vessel and FIG. 8 illustrates a support concept with reactor vessel void 2A and a void for a satellite tank with steam generation means 4A.

The monolith support structure may preferably be used for the support of a reactor that is based on a single reactor vessel that is provided with a reactor core and its associated support systems and one or more satellite tanks that each include a pump for circulation of liquid metal and a heat exchanger. Each of the satellite tanks is connected to the reactor vessel by two conduits. These conduits are preferably arranged so that liquid metal may freely circulate between the reactor vessel and the satellite tanks. This arrangement provides for hydraulic interconnection of all vessels in the system thus providing a similar system behavior as in a pool vessel. Operation of this system with one pump out of service is thus made possible as well as means of accomodating a pump failure without the use of fast acting check valves. The advantage provided by this type of an apparatus is that a large amount of liquid metal is in direct contact with the reactor core so that if the core temperature rises, there is a substantial thermal inertia that resists a sharp or sudden rise in temperature. The upper and lower conduit means may be arranged to cause the hot liquid metal to flow from the reactor vessel to the satellite tank by convection to permit a flow of liquid metal to be established that will exert a cooling effect on the reactor core in the absence of a pumped or forced circulation of liquid metal.

Each satellite tank may be provided with an intermediate heat exchanger that is a part of a primary liquid metal loop. Alternatively, the heat exchanger may include means for the direct generation of steam or it may be connected to a secondary liquid metal heat exchanger for the purpose of steam generation by a secondary liquid metal loop.

It is contemplated that the satellite tank may be fabricated as a standardized module having a defined heat exchange capacity and/or steam generation capacity. One, two, three or more modules may be connected to a single reactor vessel that may also be substantially fabricated off site. It is envisioned that the reactor vessel size would remain uniform and for small power generation needs the available space within the core region utilized for storage of spent fuel. Thus for small power generation applications, a separate vessel for storage of spent fuel would not be required and for intermediate power generation applications the size requirements for this vessel would be reduced.

The satellite tank is preferably fabricated with a transverse support structure and baffle assembly that extends across the central portion of the tank. This support structure provides means that engage and provide lateral support for the pump and heat exchanger. Vertical support is provided by a transverse support structure at the top of a satellite vessel. Provision for flow of liquid metal through the satellite tank is provided by insertion of a pump into a conduit which connects the bottom of the satellite tank with the gaseous space at the top of the vessel.

The satellite tank is intended to have a lower plenum that is utilized to contain a supply of cold liquid metal. The lower plenum should be large enough to hold an amount of liquid metal that will impart a sufficient degree of thermal inertia to aid in the prevention of rapid temperature transients to either the pump or the reactor core if abnormal operating conditions are encountered. The reactor vessel will also have a lower plenum that will hold a quantity of liquid metal that still provides a degree of thermal inertia and mixing of flows from each satellite vessel.

The upper and lower conduit means will have a relatively short length which can be basically considered to be extension of the vessel nozzles, piping support and snubber requirements and the need for auxilliary systems and structures are eliminated. Suitable thermal expansion means such as sinusoidal bellows may be used in the conduit piping. The lower conduit means may be fitted with an internal coaxial pipe that connects the pump outlet with the inlet of the core plenum that is placed around the lower portion of the reactor core. The internal coaxial pipe carries cold liquid metal that passes from the pump to the core plenum. The liquid metal flows from the core plenum upwardly through the core where it is heated and rises to the upper part of the reactor vessel. The hot liquid metal passes through the upper liquid metal conduit to the heat exchanger in the satellite tank. This heat exchanger may be an intermediate heat exchanger similar to that which is used in a pool vessel or it may be a uniquely designed heat exchanger that takes advantage of the design flexibility of the satellite vessel approach.

The reactor vessel and satellite tank are provided with a unitary containment vessel that will contain any liquid metal leakage from the reactor vessel, satellite tank or the connecting conduits. The containment vessel extends completely around the satellite tanks and the reactor vessel and it may be provided with an exterior insulated cooling shroud that defines a space surrounding the reactor vessel and satellite tanks. The cooling shroud may be provided with cooling fins and a cooling medium such as air may be circulated between the containment vessel and the cooling shroud for a diverse and independent shutdown heat removal system.

Sodium is the preferred liquid metal but other liquid metals and fluids may be utilized.

Figure 1:
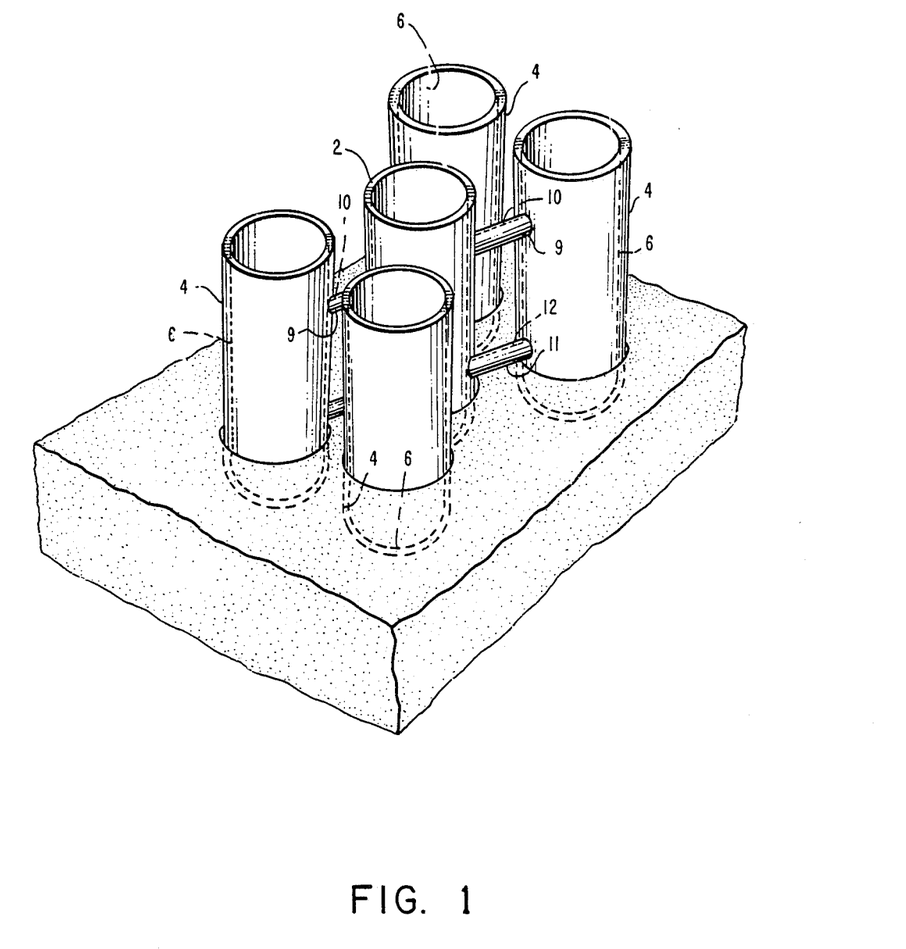
FIG. 1 is a perspective view of a monolithic support structure of the invention which has a central reactor vessel, four satellite tanks, and a fuel storage vessel.

The present invention is illustrated, as best seen in FIG. 1, in an embodiment for which one reactor vessel 2 is shown with four satellite tanks 6. The reactor vessel 2 and satellite tanks 6 are each secured within an individual containment vessel 4. Upper and lower containment passages 9 and 11 are provided to house upper and lower liquid metal conduits 10 and 12 which are connected to the reactor vessel 2. Upper and lower liquid metal conduits 10 and 12 afford communication between the reactor vessel 2 and each satellite tank 6.

Figure 2:
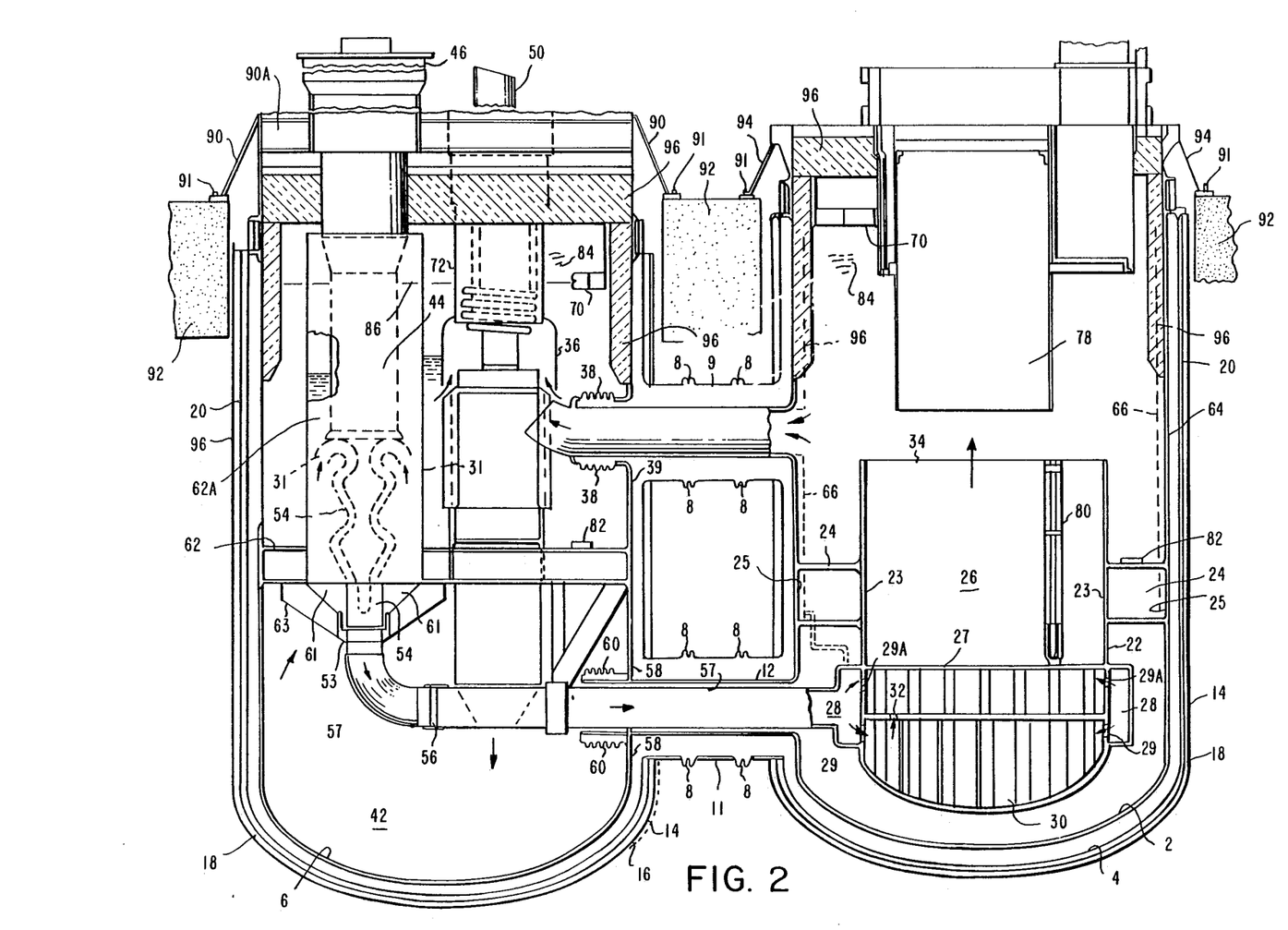
FIG. 2 is a perspective view of a liquid metal reactor that may be situated in the monolithic support structure of the invention.

The reactor vessel 2 is best seen in FIG. 2 and is comprised of a reactor core 22 supported in the reactor vessel 2 by a support bracket 24 that is affixed to the side wall 25 of the reactor vessel 2 and to the side wall 23 of the reactor core 22. A core inlet plenum 28 is affixed to the lower inlet structure of the reactor core 22. The core inlet plenum 28 communicates with a core support structure 30 through a plurality of openings 29. The core inlet plenum 28 is connected to the central portion 26 of the reactor core 22 at the lower end 27. Openings 32 and 29A allow liquid metal to flow upwardly through holes (not illustrated) into the housing 35 for the fuel support modules. A single fuel assembly 80 is shown in the reactor core. The upper area of the reactor vessel 2 and of the satellite tank 6 are provided with slosh baffles 70 that maintain a quiescent sodium/gas interface and prevent any liquid from contacting the insulated reactor vessel cover or the insulated satellite tank cover 74. Inert gas space above the baffles 70, may be filled with argon. Housing 78 contains conventional core control rods, and refueling apparatus, not illustrated.

The reactor vessel 2 may also further comprise an internal jacket 66 that is disposed on the upper side walls 64. Pipe inlet 68 is tapped off of reactor core plenum 28 to provide a flow of cool liquid sodium.

The reactor vessel 2 is surrounded by containment vessel 4 which is sealed and is filled with an inert gas such as argon to act as a container to collect any liquid sodium that leaks from the reactor vessel 2. Alternate containment closure designs such as shown in FIG. 5 can be provided to enclose the inert gas space of the satellite or reactor vessels up to the reactor vessel suspension bracket 90. A cooling shroud 14 which bears a layer of insulating material 16 is placed around the containment vessel 4. Between the containment vessel 4 and cooling shroud exists a duct space 18 which may be utilized as a channel for circulation of air or any other coolant by any suitable moving means that are not illustrated. The containment vessel may be further extended above the suspension bracket to enclose as much of the inert gas space above the suspension bracket as desired.

A gas space is also provided between the insulation and the cavity wall surface to enable circulation of coolant to keep the operating temperature of the concrete at pernissable levels. Alternatively, water cooling may be embedded beneath the concrete cavity surface for this purpose. The duct space 18 may serve as a housing for cooling fins 20 which are preferably mounted on the exterior wall of the containment vessel 4. The cooling fins are metal struts that are attached to the wall of the containment vessel to radiate heat. These cooling fins may serve as an alternate and independent means for decay heat removal by circulation of coolant past the fin surfaces. The system will also operate in the event a satellite vessel or the reactor vessel leaks liquid metal to the containment vessel. Alternate methods of operation of this system could include prefilling the containment vessel with liquid metal to further facilitate heat removal from the vessels. This mode of operation would also serve to limit the amount of liquid metal which could leak from the vessels.

Expansion joints 8 are provided in the containment passages 9 and 11 between the satellite tanks 6 and the reactor vessel 2.

A system satellite tank 6 is best seen in FIG. 2 and is further comprised of upper liquid metal conduit 10 and lower liquid metal conduit 12. Upper liquid metal conduit 10 is provided with expansion 3oints 38 that are integrally formed with the side wall 39 of satellite tank 6. The lower wall 58 of satellite tank 6 is provided with expansion joints 60. The upper liquid conduit 10 carries hot liquid sodium to the intermediate heat exchanger 36 where the heat is transferred to a secondary sodium loop 50. The heat exchanger 36 discharges cooled sodium into the lower plenum space 42. A second heat exchanger (not shown) is also present in the satellite tank. Each heat exchanger is supported by transverse support 90A. The lower plenum space 42 is configured to insure that a residual amount of liquid sodium is provided that will dampen thermal gradients encountered during abnormal operating conditions. A vertical housing 62A is provided to interconnect the lower plenum space 42 with the gaseous area 72 above the upper plenu. A vertical pump 44 is inserted in this housing, supported by the support structure 90A and it takes suction from plenum 42 with flow entering the pump suction via space 61. The intake of pump 44 is at intake port 37. Pump drive means 45, which comprise an electric motor, not illustrated, are located on the upper exterior outside surface of the satellite tank. Alternative pump means including electromagnetic fluid flow couplers may be used. The satellite tank 6 is provided with a transverse support structure 62 that supports pump housing 62A and provides lateral restraint to the housing and its pump, as well as lateral restraint to heat exchanger 36. The support structure also serves as a baffle to the stagnant liquid metal within it to separate the hot and cold pools.

Inspection and fabrication assembly access holes 82 are provided in both the satellite tank 6 and the reactor vessel 2 to allow for inspection of the various components of the reactors and for use during the fabrication phase. An inspection and manufacture hole (not shown) is also provided in the top of the satellite vessel.

Satellite suspension bracket 90 is used to support the weight of satellite tank 6 on concrete support 92 to which it is secured with bolts 91. Reactor vessel 2 is similarly supported on reactor vessel suspension bracket 94. Thermal insulation 96 is provided at the upper end of reactor vessel and satellite tank 6. Radiation shielding is provided in the upper portions of the vessels' support structure (above thermal insulation 96). Seismic forces are accomodated by having the reactor vessel support 94 rigidly attached to a concrete support 92 and satellite vessel supports 90 rigidly attached to the same concrete structure. The containment vessel is attached to the top of the reactor vessel and satellite vessels and moves with the vessels under a seismic disturbance. Expansion bellows 8 accomodate relative motion between the containment areas surrounding the reactor vessel and satellite vessels.

The pump flow circuit comprises intake port 37 and discharge passage 54. Slip 3oint 53 at the lower portion of the discharge passage 54 is connected to liquid metal duct 57 that is coaxially located inside lower liquid metal conduit 12. Liquid metal duct 56 is supported by support brackets 63 and is provided with slip joint 56 to permit thermal expansion. The liquid metal duct 57 is connected to the core inlet plenum 28.

In operation, the liquid sodium passes out through the reactor top 34 of reactor core 22 at a temperature of about 950° F. The liquid sodium then passes through the upper support structure 78, mixes in the upper plenum area of the reactor and exits to the satellite tank through the upper liquid metal conduit 10. Within the satellite vessel the liquid sodium mixes within the upper plenum area and enters the heat exchanger 36. In the heat exchanger 36 heat is transferred to a secondary sodium heat transfer loop 50 that is connected to the heat exchanger 36. The cooled liquid sodium exits the heat exchanger into satellite tank plenum 42 at a temperature of about 670° F. The cool sodium passes via channel 61 up to pump intake opening 37. The liquid sodium is taken into intake port 37 of pump 44 and discharged through discharge passage 54 into the liquid metal duct 57. The slip joint 56 is arranged so that any expansion of liquid metal duct 57 will not place any transverse stress on pump 44 or reactor core 22.

The liquid sodium flows into the core inlet plenum 20 and through the core support structure 30 and upward through openings 32 upwardly through holes 33 (not shown) into the housing 35 for the fuel support modules and passes fuel assemblies such as fuel assembly 80 where it is heated to a temperature of about 950° F. The hot sodium flows out of the top of reactor core 34.

The static level 84 of the liquid sodium in the reactor is reached only when the pump is not operating. The satellite tank operating level 86 is less than the reactor vessel operating level 88. This is due to the pressure losses in upper liquid conduit 10.

Figure 9:
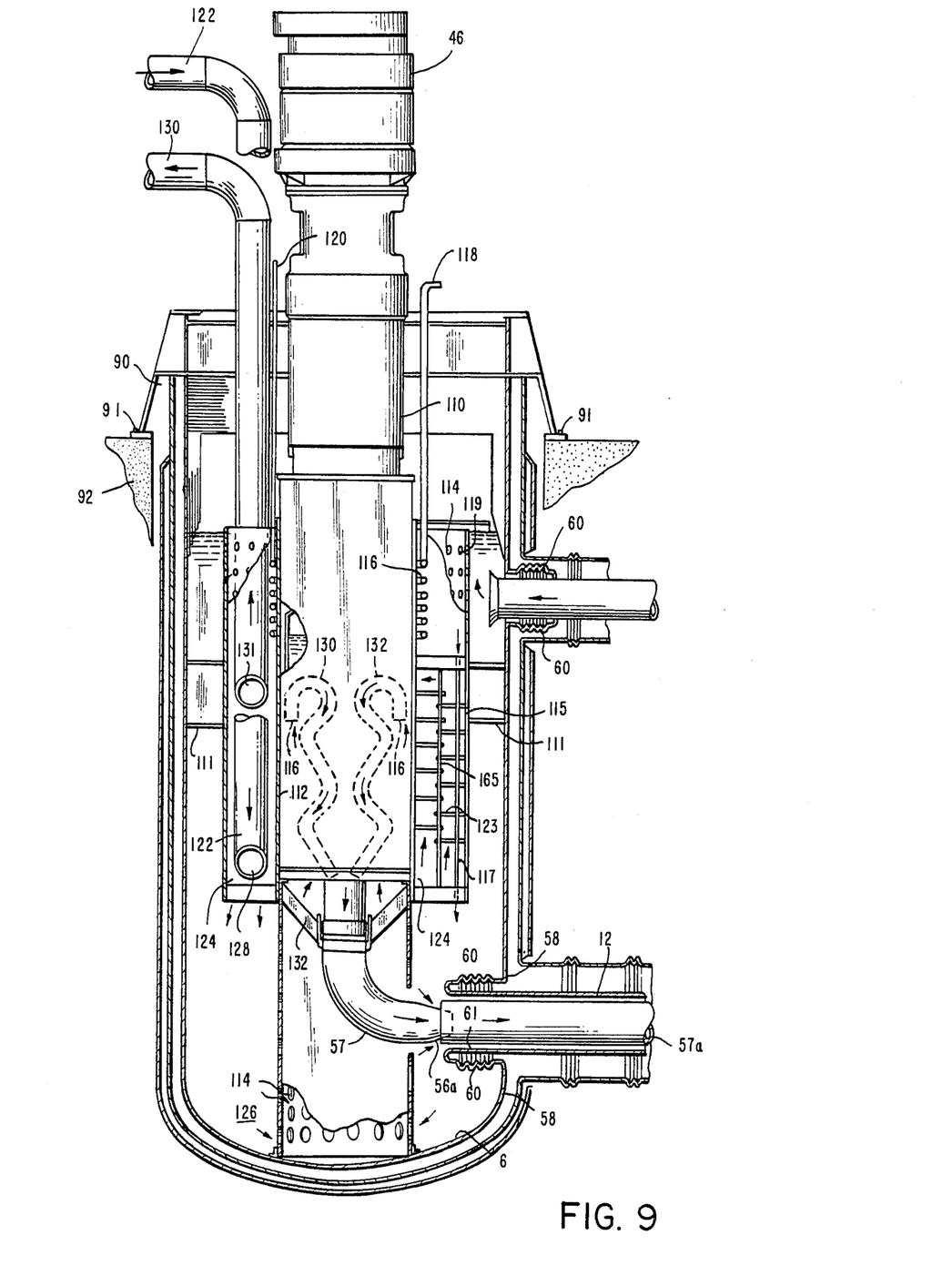
FIG. 9 is a diagrammatic sectional elevational view of a liquid metal reactor illustrating a single satellite tank with an alternate means of accomodating thermal expansion.

FIG. 9 illustrates a further emobodiment of the invention wherein satellite tank 6 is provided with an alternate means for thermal expansion. The lower wall 58 of satellite tank 6 does not have any provisions for expansion where it is joined by lower liquid metal conduit 12. Expansion means are provided by rollers 102 which support the satellite tank 6 and permit transverse motion caused by expansion of lower liquid metal conduit 12. The rollers are guided to move in a linear direction and seismic snubbers 103 are provided to limit the satellite vessel movements in the event of an earthquake. The reactor vessel is rigidly supported by means of support 94 to the concrete support structure 92. The upper part of satellite tank 6 may be provided with an internal cooling jacket 104 which provides cooling by the circulation of cool liquid sodium which is taken from the output of pump 44 through line 106 which is connected to liquid metal duct 57 at outlet 108.

Figure 10:
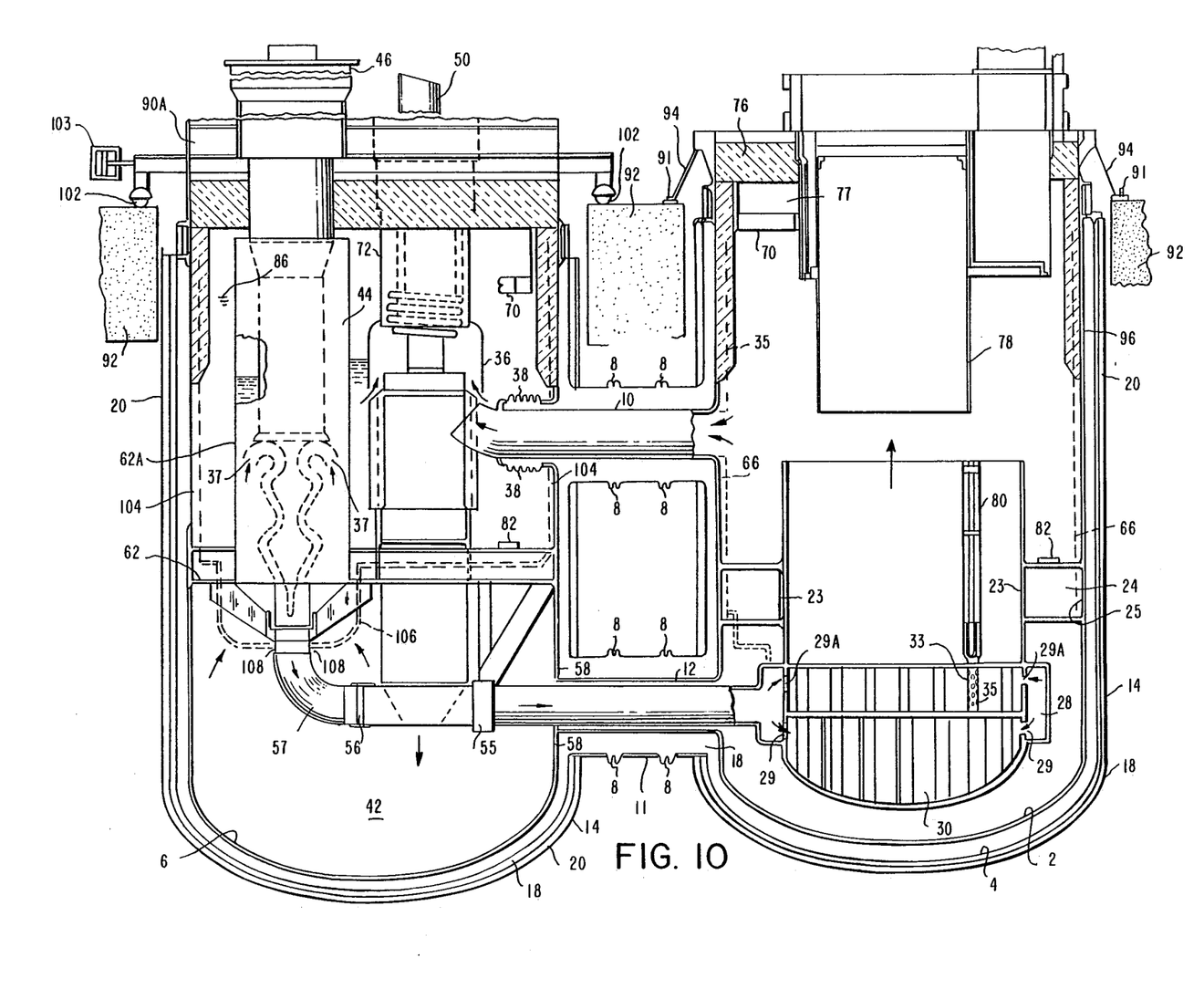
FIG. 10 is a diagrammatic sectional elevational view of a satellite tank of a liquid metal reactor with an alternate heat exchanger means.

FIG. 10 is a view of an embodiment of a satellite tank of the invention having a pump 110 that is coaxially located in the satellite tank 6 and supported principally by upper tranverse support 113. Support bracket 111 which primarily supports heat exchanger 115 may be placed at a level in the satellite tank 6 so that the vertical expansion of the satellite tank relative to the reactor vessel will not place undue stress on the horizontal conduits and pump discharge line 57. The pump housing 112 is covered on its upper exterior with a mixing baffle 114 that directs primary sodium into heat exchanger 115 that is provided with tubes 117, primary liquid sodium flows through the tubes 117, to plenum space 126. Secondary sodium enters from secondary sodium inlet duct 122 from an inlet (not shown) and is passed to the lower part 124 of the heat exchanger 115. The secondary sodium is directed around the periphery of the heat exchanger by a directing tube (not shown) which is connected to the end 128 of secondary sodium inlet duct 122. The secondary sodium outlet 130, is connected to a connecting tube (not shown) at inlet 131. The connecting tube extends partway around the periphery of the upper region of heat exchanger 115 to collect the hot secondary sodium that flows up past tube 117 which is representative of a plurality of tubes in the heat exchanger and heat exchanger baffles 123. Coils 116 are placed in the upper region of the satellite tank 6 and are connected to inlet conduit 118 and outlet conduit 120 to form a backup cooling system for use if the primary cooling system fails. Holes 119 may be of different dimensions or may have different spacing or may have a combination of different dimensions and spacing around the circumference of mixing baffle 114 to promote uniform flow of liquid metal to avoid any localized overheating.

The pump bracket 132 supports liquid metal duct 57. Flow nozzle 56a as shown in FIG. 5 provides an alternate means for connection in pump discharge line 57 that may be utilized in any of the embodiments of this invention. A gap between the flow nozzle 56a and the end of flow conduit 57a is provided to accomodate thermal expansion effects. The nozzle size and pump discharge pressure is such that a small induced flow directly from the bottom plenum of the satellite tank is possible under normal operating conditions. At shutdown when natural circulation of the primary coolant is desirable, the gap between the nozzle 56a and duct 57a will assure an unimpeded and direct flow path for natural convective flow to the core. Line 57a may be provided with a diffuser to minimize pressure losses, also spacers 61 may also be provided within the annular space of the coaxial ducts.

Figures 11, 11A:
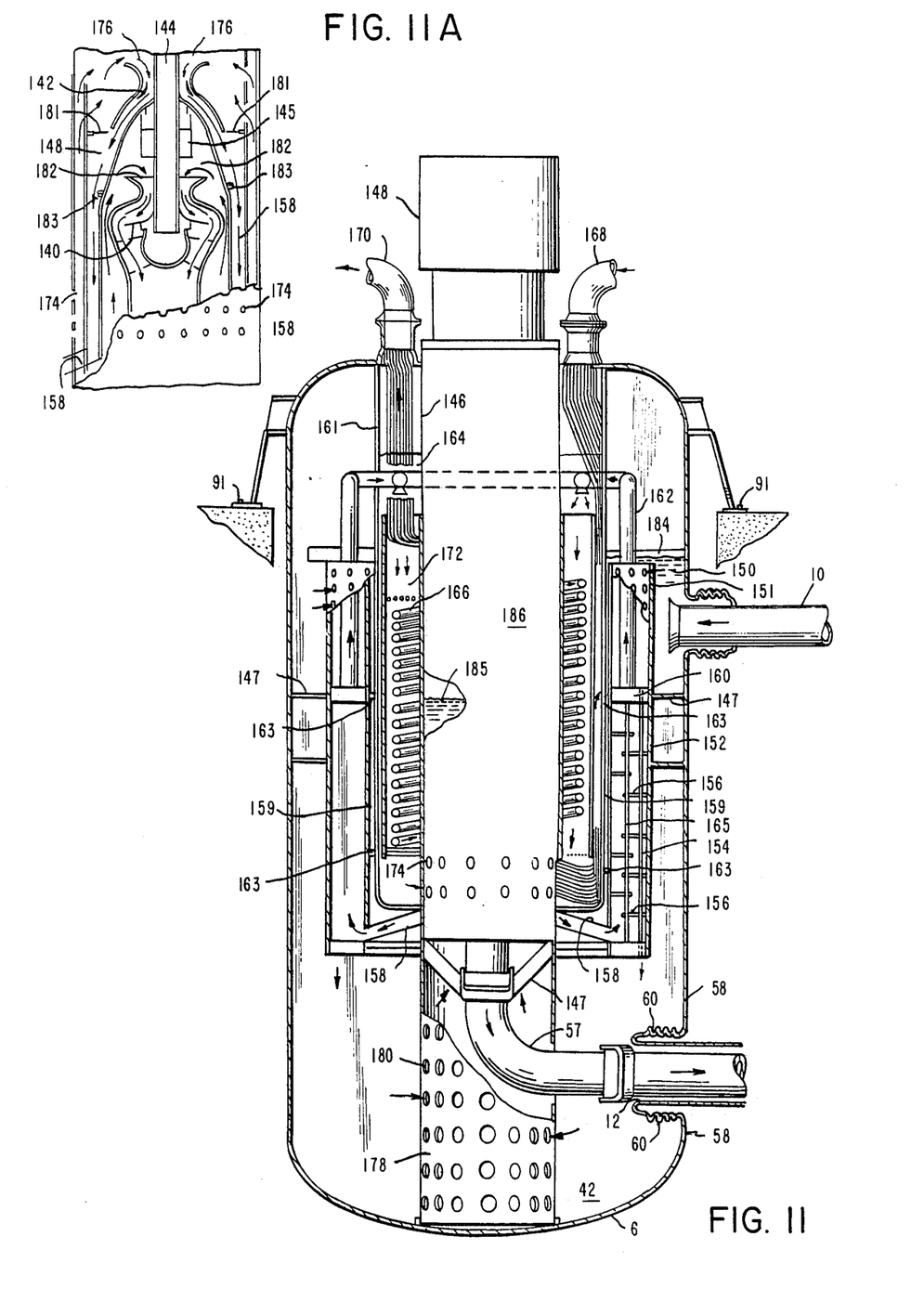
FIG. 11 is a diagrammatic sectional elevational view of a satellite tank of the liquid metal reactor with an alternate heat exchanger and pump means.
FIG. 11A is a partial cutaway view of the pump chamber of the pump in the satellite tank of FIG. 10.

FIG. 11 illustrates a sectional elevation of a combined primary and secondary system satellite tank that includes a helical coil steam generation system. The containment vessel upper transverse support structure and insulation is now shown in the view for clarity.

Central downcomer 146 acts as a support and housing for the pump 148. Support bracket 147 also provides support and stability. An annular mixing plenum 150 is provided above the upper end of heat exchanger 152. Hot liquid primary sodium is passed from upper liquid conduit 10 through holes 151 in the annular mixing plenum and then downward through vertical tubes 154 which run through annular heat exchanger 152. Heat exchanger 152 which may be welded in place or detachably affixed with suitable fasteners, is provided with baffles 156 and associated to rod 165 that insure slow upward passage of secondary sodium that is received from secondary sodium inlet duct 158. Hot secondary sodium is taken from the heat exchanger at header 160 into line 162 which directs the flow to the entrance mixing area 164 of the steam generator 161 which is provided with steam generator coils 166. The steam generator coils 166 are connected to water inlet 168 and steam outlet 170. They are formed into a helix which is partially shown. Secondary liquid sodium flows down around the steam generator coils 166 through annular heat exchanger chamber 172. At the lower end 171 of annular heat exchanger chamber 172, pump intake ports 174 direct the cool secondary liquid sodium to the pump chamber.

FIG. 11A is a partial cutaway view of the pump chamber of the pump 148. The primary pump rotor 140 and secondary pump rotor 142 are mounted on common pump shaft 144. The pump intake ports 174 direct the liquid metal to the intake channel 176 which directs the liquid sodium to secondary pump rotor 142. The output is pushed through sodium inlet duct 158 to heat exchanger 152 which is shown in FIG. 6. Cool primary liquid sodium is passed through holes 180, shown in FIG. 6, to intake channels 182. The cool liquid sodium is passed from intake channels 182 to primary pump rotor 140 which pushes liquid sodium to the reactor core plenum, (not shown) through duct 57. Pump bearing 145 is lubricated by a feed of liquid sodium that is supplied by a tube (not shown) that is tapped off of the pump discharge circuit. Upper connecting joints 181 and lower connecting joints 183 are provided to facilitate removal of the pump internals.

A perforated shield 178 that may have differently sized or differently spaced holes 180 is provided to promote uniform mixing of cool sodium in lower plenum space 42. The lower plenum space 42 is hydraulically connected with the reactor vessel (not shown) and other satellite vessels (not shown) through lower liquid metal conduit 12.

Annular space 159 serves the function of providing a conduit for the lower plenum to communicate with the upper gaseous space. Spacers 163 are provided for lateral stabilization of the steam generator under seismic conditions.

The normal operating level of liquid sodium 184 in the satellite tank 6 is at the upper level of the steam coils 166. The level of liquid sodium 185 in the pump chamber 186 is above the level of pump rotor 142 shown in FIG. 6A.

During operation, the primary pump discharge is at a higher pressure than the secondary circuit pump discharge and a continuous linkage of primary flow enters the secondary pump via the leakage past the pump bearing. The primary coolant volume is maintained by an auxilliary make up and clean up system (not shown) which is housed outside the satellite tank. This system (not shown) removes a flow equal to or greater than the pump bearing leakage flow, purifies the secondary sodium, and returns sodium to the primary system to maintain its inventory as well as any excess flow back to the secondary system circuit. In the event a steam generator tube leak occurred, the secondary system could be pressurized as a result of sodium-water reactions. A rupture disk at the top of the satellite vessel would serve to vent the pressure to a blow off system (not shown) thus maintaining the pressure integrity of the secondary sodium system circuit. Alternative pump means such as electromagnetic pumps or electromagnetic fluid flow couplers which do not require pump bearing seal leakages can be utilized for this concept.

Figures 12, 13:
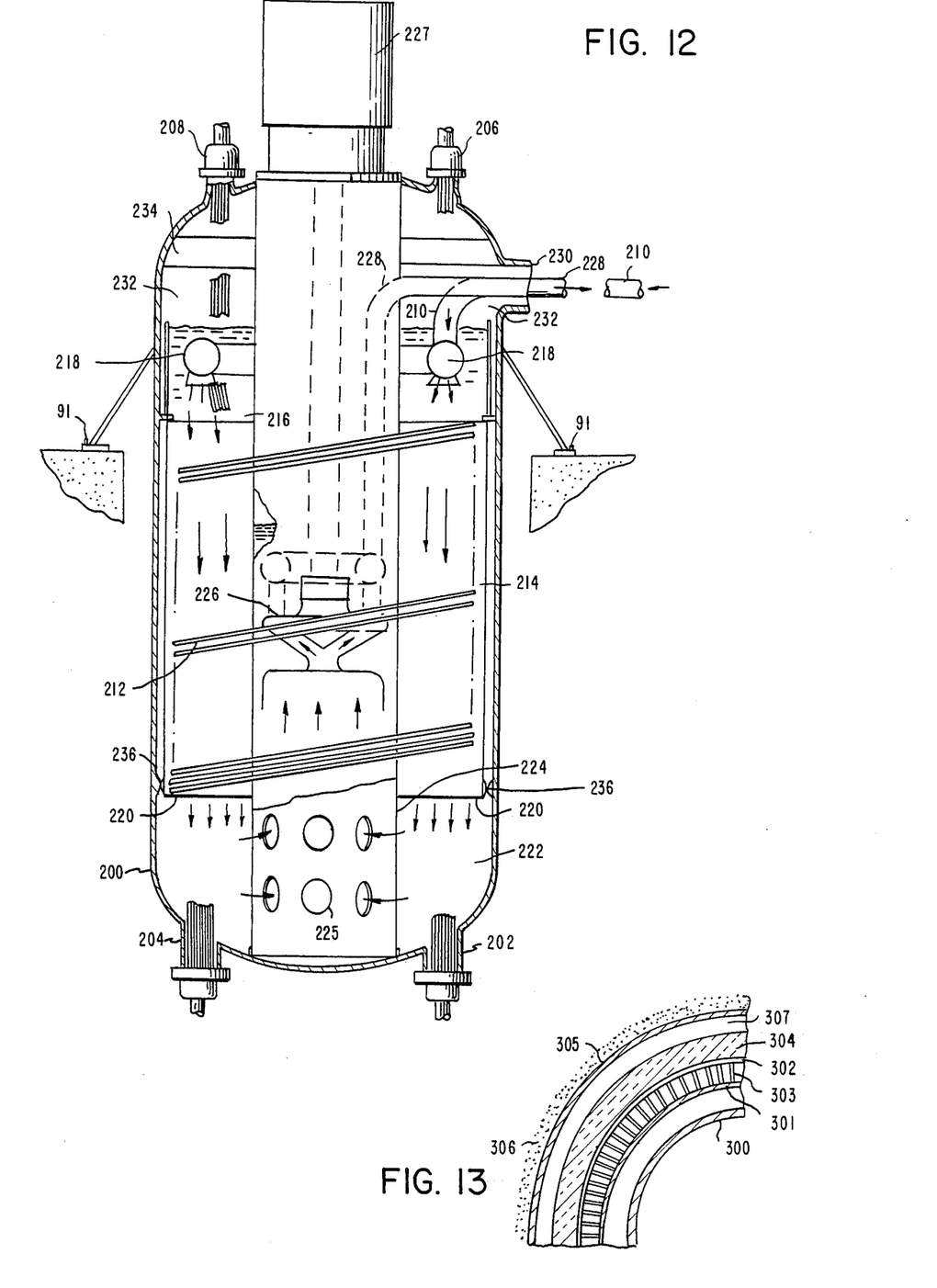
FIG. 12 is a diagrammatic sectional elevational view of a steam generation vessel for use with the liquid metal reactor.
FIG. 13 is a cross-section of a portion of the external walls of the reactor vessel or the satellite tanks.

Alternatively, these steam outlet nozzles may be located at the bottom of the vessel by routing the tubing discharge from the top of the helical bundle down past the exterior of heat exchanger 214.

FIG. 12 is a diagrammatic sectional elevation of a steam generator for use in a secondary sodium loop according to the invention. The generator comprises a tank 200, that has water inlets 202 and 204 and steam outlets 206 and 208. The intake pipe 210 is connected to a nozzle (not shown) as a part of a secondary liquid sodium loop that transfers heat from a primary sodium loop to the steam generator 200. Water inlets 202 and 204 are connected to a plurality of tubes that are formed into a helical coil that is configured as an annular heat exchanger 214. The tubing exits the helical coil and is directed to manifolds at the steams outlet nozzles 206 and 208. The annular heat exchanger 214 is provided at the upper end 216 with a manifold 218 that allows hot sodium to enter the annular heat steam generator. The lower plenum has a central downcomer 224 that is perforated with holes 225 that permit cool sodium to flow inwardly and upwardly to pump 226 which is operated by motor 227. The output pipe 228 of the pump 226 acts as a conduit to bring cool liquid sodium to outlet nozzle 230.

Inert gas space 232 is filled with a suitable inert gas such as argon. Bracket 234 stabilizes the pump housing 235 and bumpers 236 provide lateral support while accomodating thermal expansion and seismic forces.

Nozzle 230 sidewalls are envisioned to be extended coaxially around piping 228 and 210 up to the entrance and exit nozzles for this piping at the top of the satellite tank, using suitable thermal expansion means such as bellows. Appropriate insulation (not shown) may be used on the upper interior walls of the steam generator.

Any alternate steam generator may be utilized with the novel reactor of the invention such as the steam generator disclosed in ASME paper 80-C2/NE-29 which is incorporated by reference.

FIG. 13 is a partial cross-section of the outer walls of the reactor tank or satellite tanks of the invention. Vessel wall 300 is tht interior wall of either the reactor vessel or the satellite tank. The containment vessel 301 surrounds the vessel wall and on its exterior surface has a plurality of cooling fins 303 that are provided between containment vessel 301 and shroud 302. An insulating layer 304 is placed on the exterior of shroud 2 between the cavity wall of the liner 305, for concrete wall 306, to define an annular space 307 between insulating layer 304 and liner 305.

The liquid metal reactor of the invention may be fabricated in dimensions that are selected according to the desired output. Generally reactor vessel and satellite tanks may be from about 5–15 meters. In diameter and from about 15–23 meters in height. The upper and lower liquid metal conduits may be about 50 cm–130 cm in diameter and the containment vessel may be spaced approximately 20–35 cm from the satellite tanks and reactor vessel. The cooling fins may be 0.1 cm–5 cm thick and may extend from the wall of the containment vessel for 2 cm–20 cm to the shroud. The reactor vessel and the satellite tanks may be spaced from 1 to 10 meters apart.

While the invention has been disclosed with respect to the particular drawings and embodiments shown and described, the invention is not to be limited thereby but is only to be limited by the scope of the appended claims.

We claim:

1. In a nuclear reactor having a nuclear reactor vessel, a support structure comprising:
    (a) a basemat and an unitary reinforced concrete core having exterior walls and containing an open vertical void for placement of a nuclear reactor vessel, said void extending from the top of basemat to the top surface of the unitary reinforced concrete core, said concrete core providing structural support to the reactor vessel at the upper end of said reactor vessel and upper end of said core and said core providing shielding for radiation from the reactor vessel;
    (b) said reinforced concrete core having concrete ligaments in said unitary reinforced concrete core between said void and the edge of said concrete core, said ligaments extending from the top of said core to the basemat where said core is integrally connected to said basemat and said ligaments being large enough to assure that the deformation of support structure is shear controlled and
    (c) said unitary reinforced concrete core and basemat having a distribution of mass and stiffness which provides a fundamental horizontal natural frequency of vibration greater than 10 Hertz for said unitary concrete core and basemat and greater than the fundamental natural frequency of the supported reactor vessel.

2. A support structure for a nuclear reactor as defined in claim 1 wherein said reinforced concrete core has a fundamental frequency of vibration sufficiently above 10 Hertz and above the major components fundamental natural frequencies so that seismic coupling effects do not result in significant amplification of ground level seismic forces to the supported components.

3. A support structure for a nuclear reactor as defined in claim 1 wherein the exterior walls of said unitary core are flat.

4. A support structure for a nuclear reactor as defined in claim 1 wherein the exterior walls of said unitary core are circular.

5. A support structure for a nuclear reactor as defined in claim 1 further comprising passages for heat removal means and inspection means.

6. A support structure for a nuclear reactor as defined in claim 5 which is made of prestressed concrete.

7. A support structure for a nuclear reactor as defined in claim 5 further comprising a plurality of openings in said core for permitting inspection access to said nuclear reactor and said heat removal means.

8. A support structure for a nuclear reactor as defined in claim 7 further comprises a plurality of exterior compartments adjacent to said unitary reinforced concrete core.

9. A support structure for a nuclear reactor as defined in claim 8 which further comprises an exterior compartment adjacent to said unitary reinforced concrete core which contains steam generation means that is connected to said heat removal means.

10. A support structure as defined in claim 1 further comprising a plurality of open vertical voids for placement of vessels other than the reactor vessel.

11. A support structure as defined in claim 1 further comprising a void for supporting a steam generator.

12. A support structure as defined in claim 1 further comprising a void for supporting a fuel storage cell.

13. In a nuclear reactor having a nuclear reactor vessel, means for exchanging heat, means for generating steam and means for pumping a coolant, a support structure comprising:
    (a) a reinforced concrete basemat:
    (b) a unitary reinforced core;
    (c) said reinforced core containing a central vertical void for housing a nuclear reactor vessel said core having exterior walls; a plurality of vertical voids for satellite tanks that include heat exchanger means and pump means; and
    (d) at least two horizontal voids between the central vertical void in said central core and the voids for said satellite tanks, said horizontal voids connecting the central vertical void to vertical voids for satellite tanks that are sized to accomodate upper and lower liquid metal conduits between said nuclear reactor vessel and said satellite tanks;
    (e) said reinforced concrete core having concrete ligaments in said unitary reinforced concrete core between said vertical voids and the edge of said concrete core, said ligaments extending from the top of said core to said basemat where said core is integrally connected to said basemat and said ligaments being large enough to assure that deformation of the support structure is shear controlled, and
    (f) said reinforced concrete core and basemat having a distribution of mass and stiffness which provides a fundamental horizontal natural frequency greater than 10 Hertz and greater than the natural frequency of the supported components.

14. A support structure as defined in claim 13 further comprising of a void for supporting a steam generator.

15. A support structure as defined in claim 13 further comprising of a void for supporting a fuel storage vessel.

16. A support structure as defined in claim 11 further comprising at least one horizontal void.

17. A support structure as defined in claim 11 further comprising at least two horizontal voids.

* * * * *